(12) United States Patent
Tang et al.

(10) Patent No.: US 9,639,182 B1
(45) Date of Patent: May 2, 2017

(54) CAPACITIVE STYLUS WITH ERASER

(71) Applicant: WALTOP INTERNATIONAL CORPORATION, Hsinchu (TW)

(72) Inventors: Ying Hwa Tang, Hsinchu (TW); A-Li Wong, Hsinchu (TW)

(73) Assignee: Waltop International Corporation, Hsinchu (TW)

( * ) Notice: Subject to any disclaimer, the term of this patent is extended or adjusted under 35 U.S.C. 154(b) by 0 days.

(21) Appl. No.: 14/960,118

(22) Filed: Dec. 4, 2015

(30) Foreign Application Priority Data

Oct. 16, 2015 (TW) .............................. 104216627 U

(51) Int. Cl.
*G06F 3/0354* (2013.01)

(52) U.S. Cl.
CPC ................. *G06F 3/03545* (2013.01)

(58) Field of Classification Search
CPC ... G06F 3/03545; G06F 3/03542; G06F 3/037
See application file for complete search history.

(56) References Cited

U.S. PATENT DOCUMENTS

| | | | | |
|---|---|---|---|---|
| 5,654,529 A * | 8/1997 | Yeung | ................. | G06F 3/03545 178/19.03 |
| 9,213,424 B1 * | 12/2015 | Dunn | ................. | G06F 3/03545 |
| 2007/0188480 A1 * | 8/2007 | Teng | ................... | G06F 3/03545 345/179 |
| 2011/0080378 A1 * | 4/2011 | Hsu | ........................ | G06F 1/32 345/179 |
| 2014/0168177 A1 * | 6/2014 | Mkrtchyan | ............. | G06F 3/041 345/179 |
| 2015/0029162 A1 * | 1/2015 | Harris | ................. | G06F 3/03545 345/179 |
| 2015/0091856 A1 * | 4/2015 | Park | ...................... | G06F 3/0416 345/174 |
| 2015/0212600 A1 * | 7/2015 | Zerayohannes | ..... | G06F 3/03545 345/179 |
| 2015/0212601 A1 * | 7/2015 | Zerayohannes | ..... | G06F 3/03545 345/179 |
| 2015/0338940 A1 * | 11/2015 | Vong | ..................... | H04L 65/403 345/179 |
| 2016/0202776 A1 * | 7/2016 | Maloo | ................. | G06F 3/03545 345/174 |
| 2016/0239111 A1 * | 8/2016 | Zaitsev | ................. | G06F 3/0416 |
| 2016/0266667 A1 * | 9/2016 | Xiao | ................... | G06F 3/03545 |

* cited by examiner

*Primary Examiner* — Gene W Lee
(74) *Attorney, Agent, or Firm* — Donald E. Stout; Stout, Uxa & Buyan, LLP

(57) ABSTRACT

A capacitive stylus, as an inputting device of a touch sensitive device, comprises a pen and a detachable eraser. The pen comprises a tip for writing on a screen of the touch sensitive device, a control circuit for emitting signals to the touch sensitive device, and a battery for providing electricity to the control circuit. The eraser includes an erasing circuit and a first end to combine with the pen, so that the erasing circuit electrically connects with the control circuit. The eraser includes a second end that is compressible, so that the control circuit can emit an erasing signal to the touch sensitive device.

11 Claims, 7 Drawing Sheets

CAPACITIVE STYLUS WITH ERASER

CROSS-REFERENCE TO RELATED APPLICATIONS

The entire contents of Taiwan Patent Application No. 104216627, filed on Oct. 16, 2015, from which this application claims priority, are expressly incorporated herein by reference.

BACKGROUND OF THE INVENTION

1. Field of the Invention

The present invention relates to an inputting device, and more particularly relates to a capacitive stylus with detachable eraser.

2. Description of Related Art

Touch sensitive devices are becoming increasingly popular because of their ease and versatility of operation. A touch sensitive device can generally allow a user to perform various functions by touching or hovering over its panel using one or more fingers. The touch sensitive device recognizes a touch event and the position of the touch event on the panel, and then interprets the touch event, and thereafter performs one or more operations based on the touch event.

Dictating by one or more fingers, however, may be inconvenient or limited for some situations and people. For example, writing on the screen by one or more fingers may be inconvenient for some people. A capacitive stylus is therefore developed for helping the user to operate the touch sensitive device.

It would be more convenient for some situations if the user can erase the handwriting. A need for a capacitive stylus with an erasing function is therefore arisen.

SUMMARY OF THE INVENTION

In one general aspect, the present invention relates to a capacitive stylus having a detachable eraser.

In an embodiment of the present invention, a capacitive stylus as an inputting device of a touch sensitive device is provided with a pen and a detachable eraser. The pen comprises a tip for writing on a screen of the touch sensitive device, a control circuit for emitting signals to the touch sensitive device, and a battery providing electricity to the control circuit. The detachable eraser comprises an erasing circuit, a first end for combining with the pen so as to electrically connect with the erasing circuit with the control circuit, and a second end for being compressed so as to emit an erasing signal transmitted from the control circuit.

In an embodiment, a first end of the pen comprises a first connector, the first end of the detachable eraser comprises a first connector, and the first connector of the pen is capable of combining with the first connector of the detachable eraser.

In an embodiment, the detachable eraser further comprises an emitting electrode, and when the first end is combined with the pen and the second end is compressed, the control circuit emits the erasing signal via the emitting electrode to the touch sensitive device.

In an embodiment, the emitting electrode is arranged at the second end of the detachable eraser.

In an embodiment, the emitting electrode is arranged within the detachable eraser.

In an embodiment, a frequency, a modulation, an emitting period, and/or an digitally transmitted information of the signal is different from that of the erasing signal.

In an embodiment, the detachable eraser further comprises a switch for actuating the erasing signal.

DETAILED DESCRIPTION OF THE PREFERRED EMBODIMENT

Reference will now be made in detail to specific embodiments of the invention. Examples of these embodiments are illustrated in accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known process operations and components are not been described in detail in order not to unnecessarily obscure the present invention. While drawings are illustrated in details, it is appreciated that the quantity of the disclosed components may be greater or less than that disclosed, except expressly restricting the amount of the components. Wherever possible, the same or similar reference numbers are used in drawings and the description to refer to the same or like parts.

Figure 1A:
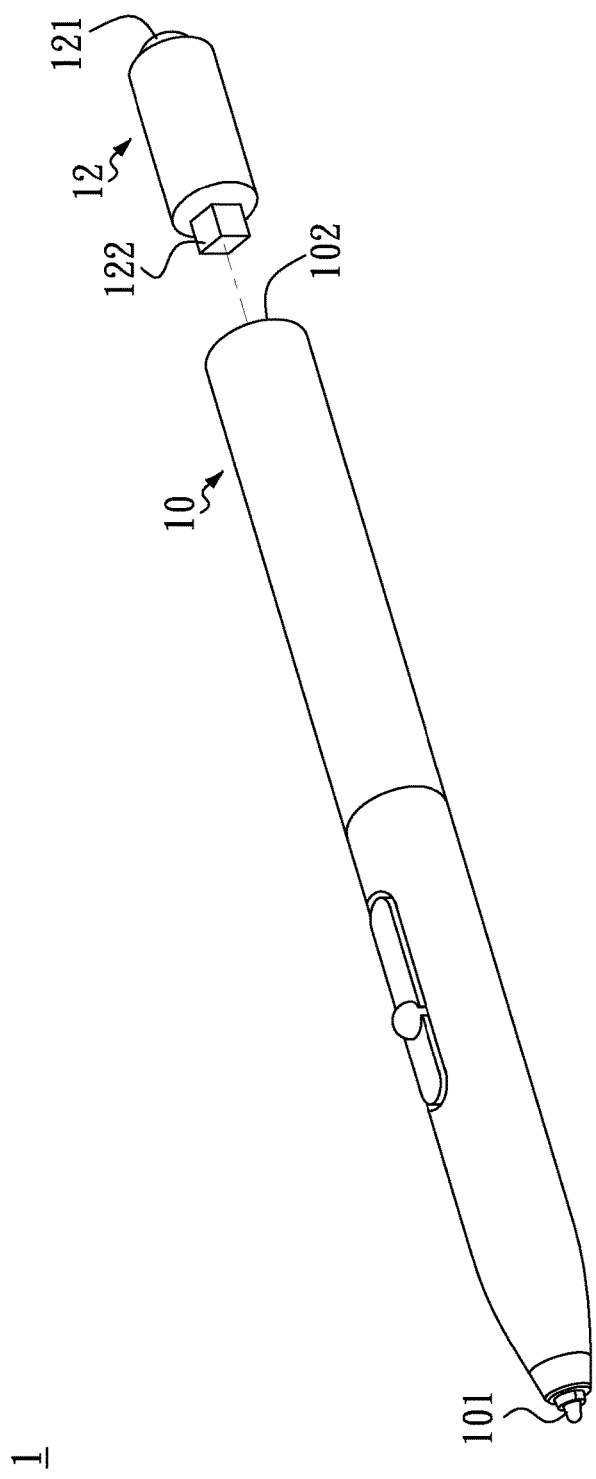
FIGS. 1A and 1B are perspective views showing a capacitive stylus according to an embodiment of the present invention.
Figure 1B:
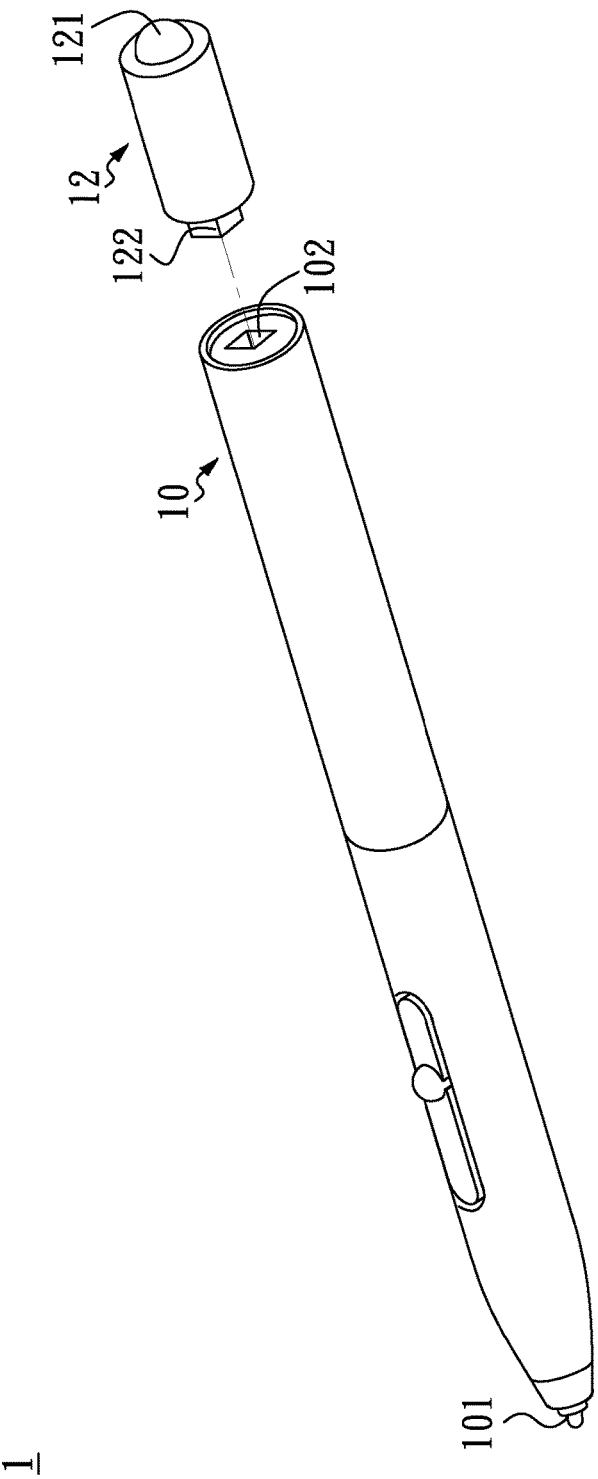

FIGS. 1A and 1B are perspective views, showing a capacitive stylus 1 according to an embodiment of the present invention. In this preferred embodiment, the capacitive stylus 1 is used as an inputting device of a touch sensitive device (not shown), such as a mobile phone, a tablet personal computer, or the likes. The touch sensitive device may include a touch screen or include in-cell photo sensors, so that the touch events and touch positions of the user can be detected. In an embodiment of the present invention, the touch sensitive device includes, but is not limited to, a capacitive touch screen.

Referring to FIGS. 1A and 1B, the capacitive stylus 1 comprises a pen 10 and a detachable eraser 12. The front end of the pen 10 includes a tip 101 and the pen 10 itself can function as a typical capacitive stylus, i.e., writing on a screen of the touch sensitive device via the tip 101 and emitting a signal via the tip 101 or via other electrodes, so that the touch sensitive device receives the signal and performs one or more operations according to the signal. In addition, the rear end of the pen 10 has a first connector 102, the front end (first end) of the eraser 12 has a first connector 122, and the rear end (second end) of the eraser 12 has an emitting electrode 121. When the first connector 102 of the pen 10 combines with the first connector 122 of the eraser 12, and the second end (rear end) of the eraser 12 is compressed, e.g., compressed against the screen of the touch sensitive device, then the capacitive stylus 1 will emit an erasing signal via the emitting electrode 121. Such that the touch sensitive device will receive the erasing signal and perform the erasing operation, e.g., erasing the handwriting within a predetermined area around the emitting electrode 121.

Figure 2:
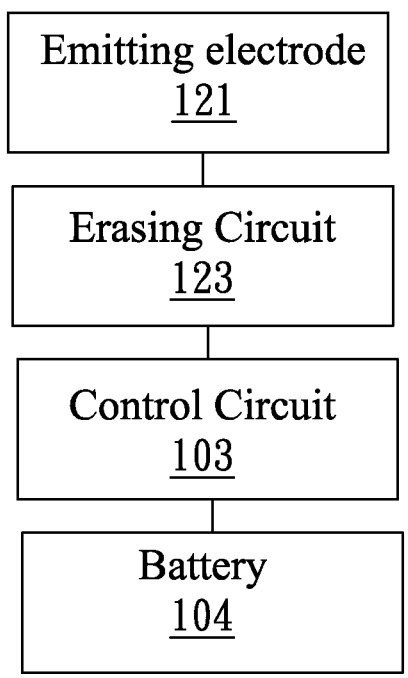
FIG. 2 is a block diagram showing the major components of a capacitive stylus according to an embodiment of the present invention.

FIG. 2 is a block diagram showing the major components of the capacitive stylus 1 in accordance with an embodiment of the present invention. Referring to FIGS. 1A and 2, the pen 10 of the capacitive stylus 1 may comprise a control circuit 103 and a battery 104, which provides electricity to the control circuit 103. In addition, the detachable eraser 12 of the capacitive stylus 1 may comprise an erasing circuit 123 and an emitting electrode 121. When the first connector 102 of the pen 10 combines with the first connector 122 of the eraser 12, the erasing circuit 123 will electrically connect with the control circuit 103 of the pen 10. At this situation, if the user compresses the second end the eraser 12 against the screen of the touch sensitive device, then the capacitive stylus 1 will emit an erasing signal via the emitting electrode 121. Such that the touch sensitive device will receive the erasing signal and perform the erasing operation, e.g., erasing the handwriting within a predetermined area. Notice that the battery 104 within the pen 10 provides the electricity needed for emitting the erasing signal.

Figure 3A:
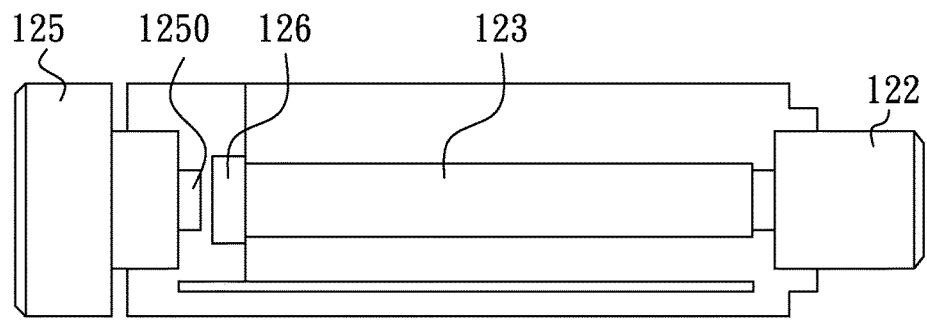
FIG. 3A and FIG. 3B are cross-sectional view and block diagram, respectively, showing a detachable eraser according to an embodiment of the present invention.
Figure 3B:
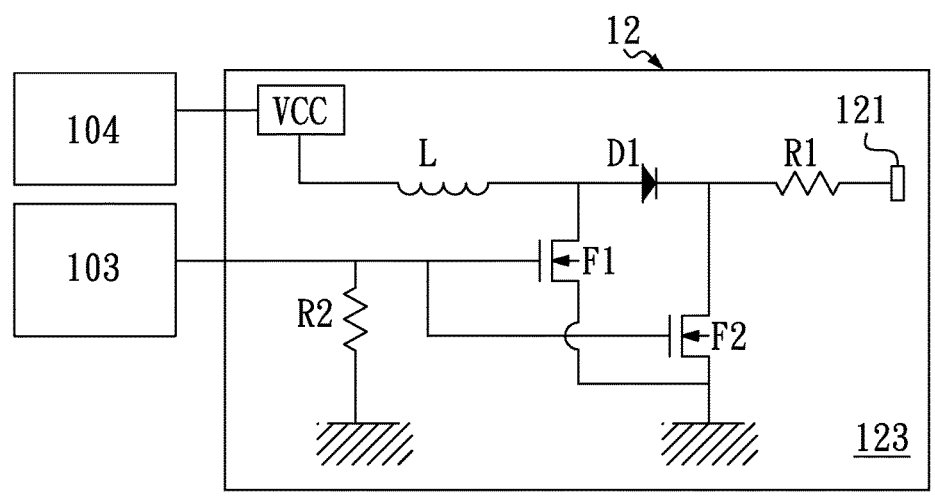

FIGS. 3A and 3B illustrate an eraser 12 according to an embodiment of the present invention. Referring to FIGS. 3A and 3B, the first end of the eraser 12 may include a first connector 122, and the second end of the eraser 12 may include a second connector 125. In addition, a switch 126 may be arranged within the eraser 12 and arranged near to the second connector 125. The mentioned emitting electrode 121 (not shown) may be arranged at the second connector 125 or may be arranged within the eraser 12. Referring to FIG. 1, FIG. 2, and FIG. 3A, when the first connector 102 of the pen 10 combines with the first connector 122 of the eraser 12, the erasing circuit 123 will electrically connect with the control circuit 103 of the pen 10. The second connector 125 may be omitted in another embodiment of the present invention.

Referring to FIG. 3B, the erasing circuit 123 of the eraser 12 may comprise, but is not limited to, an inductance L, a diode D1, a first resistance R1, an emitting electrode 121, a second resistance R2, a first field-effect transistor F1, and a second field-effect transistor F2. The first end of the inductance L connects with power supply VCC, and the second end of inductance L connects with the first end of the diodes D1 and the drain of the first field-effect transistor F1. Typically the power supply VCC is an external power and the power is provided by the battery 104. The power supply VCC could be an independent power supply and is arranged within the eraser 12 in another embodiment of the present invention. In addition, the second end of the diode D1 connects with the first end of the first resistance R1, and the second end of the first resistance R1 connects with the emitting electrode 121. When the first connector 102 of the pen 10 combines with the first connector 122 of the eraser 12, the gate of the first field-effect transistor F1 connects with the control circuit 103 and the gate of the second field-effect transistor F2 connects with the control circuit 103. The source of the first field-effect transistor F1 is grounded. The control circuit 103 may comprise a micro control unit. Further, the first end of the second resistance R2 connects with the control circuit 103 and the gate of the first field-effect transistor F1, and the second end the second resistance R2 is grounded. The drain of the second field-effect transistor F2 connects with the second end of the diode D1, and the source of the second field-effect transistor F2 is grounded.

Referring to FIG. 3A and FIG. 3B, when the second end of the eraser 12 is compressed, e.g., the second connector 125 being pressed against the screen of the touch sensitive device, then the second connector 125 is moving inwardly, so that a plug 1250 or a block 1250 of the second connector 125 collides with the switch 126 and results in the switch 126 being switched to an ON position. By doing so, the switch 126 electrically connects with the control circuit 103, and the control circuit 103 employs the emitting electrode 121 to emit an erasing signal. The touch sensitive device receives the erasing signal and performs the erasing operation.

Because both the pen 10 and the eraser 10 can emit signals to the touch sensitive device, the touch sensitive device needs to recognize the signal is emitted from which one device. Generally, the two types of signals can be design to have different frequency, modulation, emitting period, and/or different information transmitted in a digital manner, so that the touch sensitive device can recognize that the received signal is emitted from the pen 10 or emitted from the eraser 12. And then the touch sensitive device transmits the received signal or information to a controller to perform writing, erasing, or other operations corresponding to the received signal or information.

In the embodiment of FIG. 3B, the erasing circuit 123 merely comprises a signal outputting circuit (L, D1, R1, R2, F1, F2, and 121) for emitting the erasing signal. In another embodiment of the present invention, the erasing circuit 123 may further comprise a signal inputting circuit for receiving signals from the touch sensitive device via the emitting electrode 121.

In addition, in another embodiment of the present invention, the erasing circuit 123 merely comprises the emitting electrode 121, and the other components of the signal outputting circuit (L, D1, R1, R2, F1, and F2) are arranged at the control circuit 103 of the pen 10. Further, in another embodiment of the present invention, the erasing signal is not actuate by the switch 126, i.e., the switch 126 being omitted. Instead of using the switch 126, the erasing signal is continuously emitting from the emitting electrode 121 when the first connector 102 of the pen 10 combines with the first connector 122 of the eraser 12.

Figure 4:
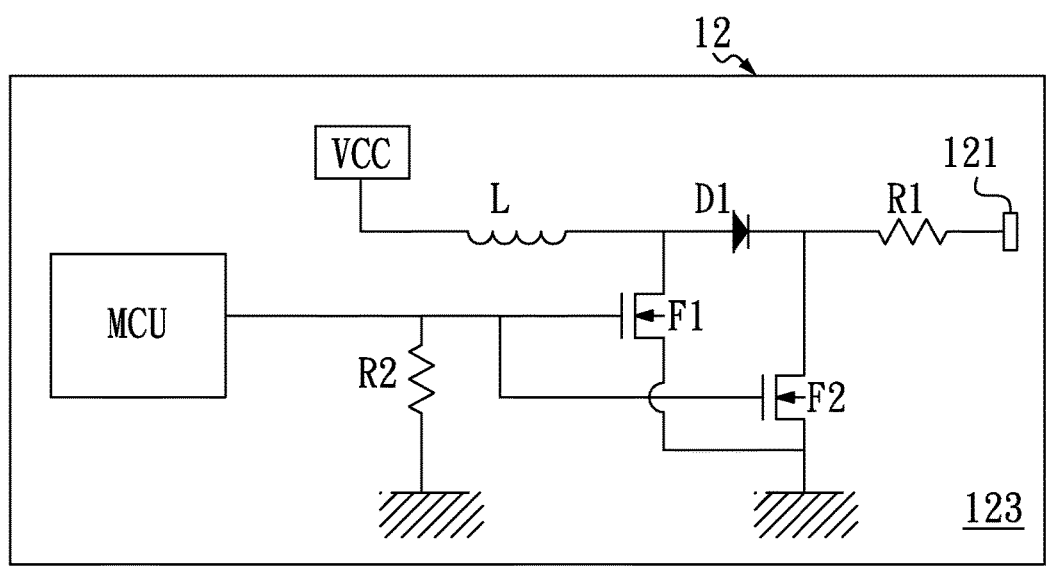
FIG. 4 is a block diagram showing a detachable eraser according to another embodiment of the present invention.

FIG. 4 is a block diagram showing an eraser 12 of the capacitive stylus 1 according to another embodiment of the present invention. The erasing circuit 123 of the eraser 12 has the same components as shown in FIG. 3B and further comprises an independent micro control unit MCU and an independent power supply VCC. Therefore, in this embodiment the eraser 12 itself can emit the erasing signal even if the eraser 12 is not combined with the pen 10.

Figure 5A:
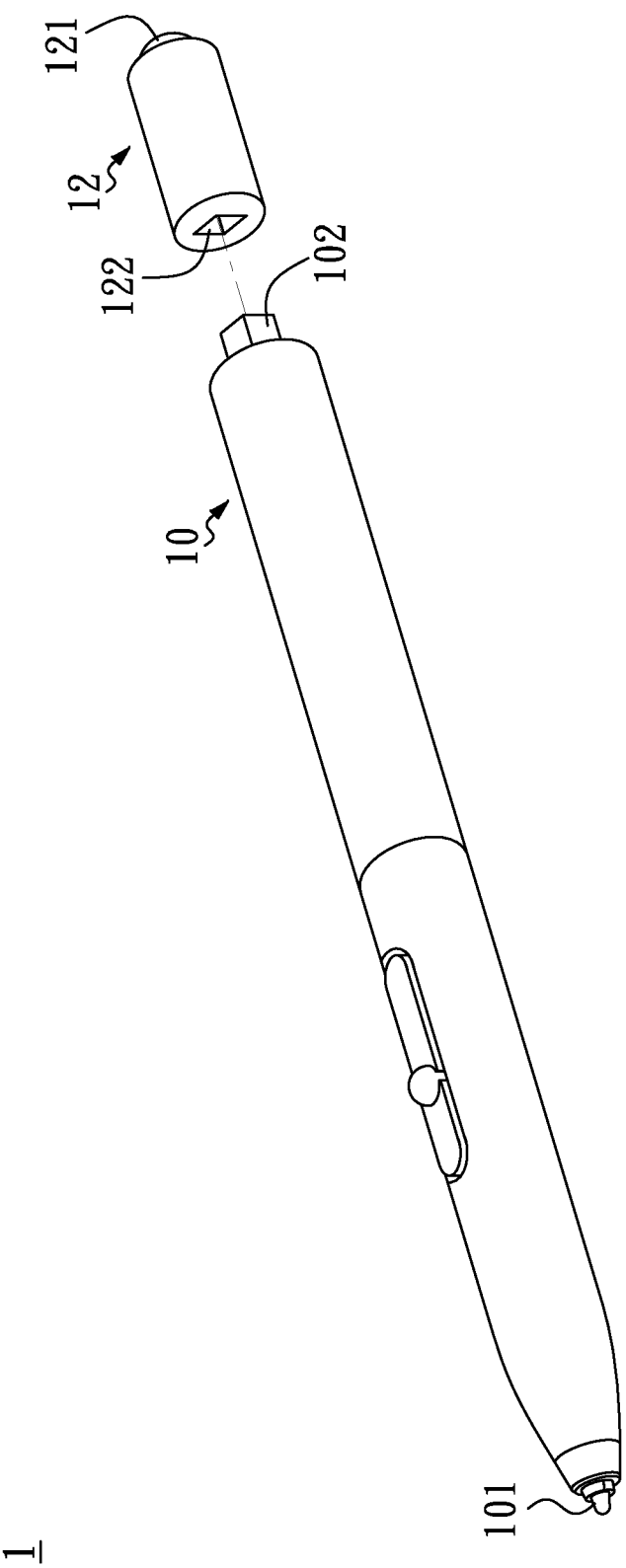
FIGS. 5A and 5B are perspective views showing a capacitive stylus according to another embodiment of the present invention.
Figure 5B:
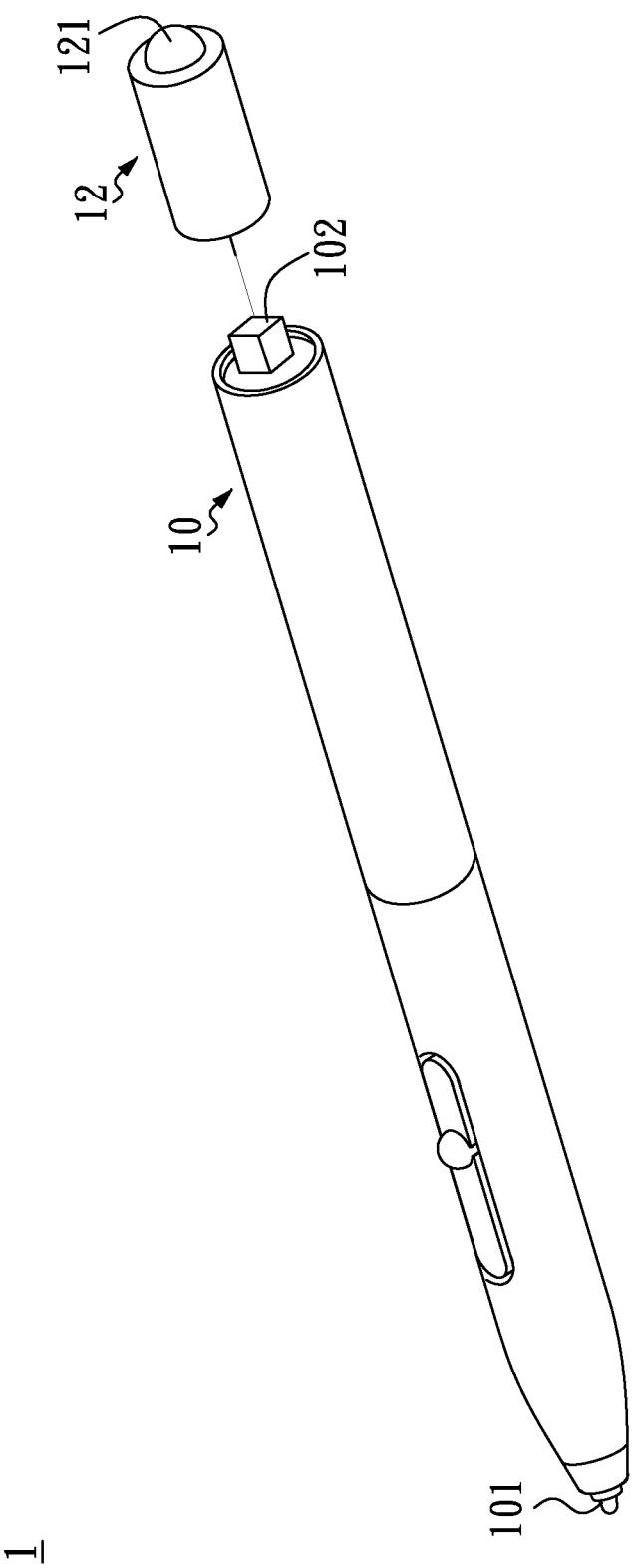

The shape of the first connector 122 of the eraser 12 and the first connector 102 of the pen 10 are not limited and may have other configurations. FIGS. 5A and 5B are perspective views showing a capacitive stylus according to another embodiment of the present invention. In this embodiment, the first connector 122 of the eraser 12 includes a recess, and the first connector 102 of the pen 10 has a plug fitting for the recess of the first connector 122. The other details of this embodiment are the same as the foregoing embodiments and the description of which is therefore omitted.

The intent accompanying this disclosure is to have each/all embodiments construed in conjunction with the knowledge of one skilled in the art to cover all modifications, variations, combinations, permutations, omissions, substitutions, alternatives, and equivalents of the embodiments, to the extent not mutually exclusive, as may fall within the spirit and scope of the invention. Corresponding or related structure and methods disclosed or referenced herein, and/or in any and all co-pending, abandoned or patented application(s) by any of the named inventor(s) or assignee(s) of this application and invention, are incorporated herein by reference in their entireties, wherein such incorporation includes corresponding or related structure (and modifications thereof) which may be, in whole or in part, (i) operable and/or constructed with, (ii) modified by one skilled in the art to be operable and/or constructed with, and/or (iii) implemented/made/used with or in combination with, any part(s) of the present invention according to this disclosure, that of the application and references cited therein, and the knowledge and judgment of one skilled in the art.

Conditional language, such as, among others, "can," "could," "might," or "may," unless specifically stated otherwise, or otherwise understood within the context as used, is generally intended to convey that embodiments include, and in other interpretations do not include, certain features, elements and/or steps. Thus, such conditional language is not generally intended to imply that features, elements and/or steps are in any way required for one or more embodiments, or interpretations thereof, or that one or more embodiments necessarily include logic for deciding, with or without user input or prompting, whether these features, elements and/or steps are included or are to be performed in any particular embodiment.

All of the contents of the preceding documents are incorporated herein by reference in their entireties. Although the disclosure herein refers to certain illustrated embodiments, it is to be understood that these embodiments have been presented by way of example rather than limitation. For example, any of the particulars or features set out or referenced herein, or other features, including method steps and techniques, may be used with any other structure(s) and process described or referenced herein, in whole or in part, in any combination or permutation as a non-equivalent, separate, non-interchangeable aspect of this invention. Corresponding or related structure and methods specifically contemplated and disclosed herein as part of this invention, to the extent not mutually inconsistent as will be apparent from the context, this specification, and the knowledge of one skilled in the art, including, modifications thereto, which may be, in whole or in part, (i) operable and/or constructed with, (ii) modified by one skilled in the art to be operable and/or constructed with, and/or (iii) implemented/made/used with or in combination with, any parts of the present invention according to this disclosure, include: (I) any one or more parts of the above disclosed or referenced structure and methods and/or (II) subject matter of any one or more of the inventive concepts set forth herein and parts thereof, in any permutation and/or combination, include the subject matter of any one or more of the mentioned features and aspects, in any permutation and/or combination.

Although specific embodiments have been illustrated and described, it will be appreciated by those skilled in the art that various modifications may be made without departing from the scope of the present invention, which is intended to be limited solely by the appended claims.

What is claimed is:

1. A capacitive stylus as an inputting device of a touch sensitive device, comprising:
    a pen comprising:
        a tip for writing on a screen of the touch sensitive device;
        a control circuit for emitting a signal to the touch sensitive device; and
        a battery providing electricity to the control circuit; and
    a detachable eraser, comprising:
        an erasing circuit;
        a first end for combining with the pen so that the erasing circuit electrically connects with the control circuit;
        a second end for being compressed so as to emit an erasing signal transmitted from the control circuit.

2. The capacitive stylus of claim 1, wherein a rear end of the pen comprises a first connector, the first end of the detachable eraser comprises a first connector, and the first connector of the pen is capable of combining with the first connector of the detachable eraser.

3. The capacitive stylus of claim 1, wherein the detachable eraser further comprises an emitting electrode, and when the first end is combined with the pen and the second end is compressed, the control circuit emits the erasing signal via the emitting electrode to the touch sensitive device.

4. The capacitive stylus of claim 3, wherein the emitting electrode is arranged at the second end of the detachable eraser.

5. The capacitive stylus of claim 3, wherein the emitting electrode is arranged within the detachable eraser.

6. The capacitive stylus of claim 1, wherein a frequency, a modulation, an emitting period, and/or an digitally transmitted information of the signal is different from that of the erasing signal.

7. The capacitive stylus of claim 1, wherein the detachable eraser further comprises a switch for actuating the erasing signal.

8. A capacitive stylus as an inputting device of a touch sensitive device, comprising:
    a pen comprising:
        a tip for writing on a screen of the touch sensitive device;
        a control circuit for emitting a signal to the touch sensitive device; and
        a battery providing electricity to the control circuit; and
    a detachable eraser, comprising:
        an emitting electrode;
        a first end for combining with the pen so that the emitting electrode electrically connects with the control circuit;
        a second end for being compressed so that the emitting electrode emits an erasing signal transmitted from the control circuit.

9. The capacitive stylus of claim 8, when the first end of the detachable eraser is combined with the pen, the control circuit continuously emits the erasing signal via the emitting electrode.

10. A capacitive stylus as an inputting device of a touch sensitive device, comprising:
    a pen comprising:
        a tip for writing on a screen of the touch sensitive device;
        a control circuit for emitting a signal to the touch sensitive device; and
        a battery providing electricity to the control circuit; and an eraser capable of combining with the pen in a detachable manner, comprising:
an emitting electrode;
an erasing circuit;
a micro control unit; and
a power supply;
wherein the power supply provides electricity to the micro control unit, the erasing circuit electrically connects with the micro control unit and the emitting electrode, and the micro control unit emits an erasing signal via the emitting electrode to the touch sensitive device.

11. The capacitive stylus of claim 10, wherein the eraser further comprises a switch for actuating the erasing signal.

* * * * *